US010204360B1

(12) United States Patent
Sivertsen

(10) Patent No.: US 10,204,360 B1
(45) Date of Patent: Feb. 12, 2019

(54) SYSTEMS AND METHODS FOR PROCESSING PAYMENTS TO TRIGGER RELEASE OF DIGITAL ADVERTISING CAMPAIGNS FOR DISPLAY ON DIGITAL SIGNAGE DEVICES

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

(*) Notice: Subject to any disclaimer, the term of this patent is extended or adjusted under 35 U.S.C. 154(b) by 36 days.

(21) Appl. No.: 14/104,996

(22) Filed: Dec. 12, 2013

(51) Int. Cl.
*G06Q 30/00* (2012.01)
*G06Q 30/02* (2012.01)
*G05B 19/418* (2006.01)

(52) U.S. Cl.
CPC ................. *G06Q 30/0273* (2013.01)

(58) Field of Classification Search
CPC ................................ G06Q 30/0273
USPC ...................................... 705/14.69
See application file for complete search history.

(56) References Cited

U.S. PATENT DOCUMENTS

| | | | |
|---|---|---|---|
| 6,144,381 A | 11/2000 | Lection | |
| 6,571,279 B1 | 5/2003 | Herz et al. | |
| 7,146,567 B1 | 12/2006 | Duczmal et al. | |
| 8,413,153 B2 | 4/2013 | Harris et al. | |
| 8,515,874 B2 * | 8/2013 | Blair | G06Q 10/02 705/64 |
| 8,898,255 B2 | 11/2014 | Kim | |
| 9,064,282 B1 | 6/2015 | Carpenter | |
| 9,159,067 B1 * | 10/2015 | Lucash | G06Q 30/0277 |
| 2002/0013757 A1 | 1/2002 | Bykowsky et al. | |

(Continued)

OTHER PUBLICATIONS

"An emerging marketplace for digital advertising based on amalgamated digital signage networks". J.V. Harrison and A. Andrusiewicz. ISBN (PAPER): 0-7695-1969-5. Publication Date: Jan. 1, 2003. EEE International Conference on E-Commerce, 2003. CEC 2003. pp. 149-156. (Year: 2003).*

(Continued)

*Primary Examiner* — Maria V Vanderhorst
(74) *Attorney, Agent, or Firm* — Locke Lord LLP; Tim Tingkang Xia, Esq.

(57) ABSTRACT

Certain aspects relate to systems and methods for processing payments to trigger release of digital media content for display on digital signage devices. In certain embodiments, a management server receives a user input about payment remittance information relating to an advertising campaign, which includes media content stored at the management server. The management server then transmits the payment remittance information to an associated financial institution for processing. When the financial institution sends back a confirmation that the payment remittance has been processed, the management server updates the advertising campaign to reflect the confirmation. Upon receiving a request for advertising campaign information relating to the advertising campaign from a signage device, the management server transmits the advertising campaign information to the signage device such that the signage device may confirm the payment remittance related to the advertising campaign information, and display the media content on the signage device.

22 Claims, 6 Drawing Sheets

(56) References Cited

U.S. PATENT DOCUMENTS

| | | |
|---|---|---|
| 2002/0046235 A1 | 4/2002 | Foy |
| 2003/0149601 A1 | 8/2003 | Cabral |
| 2004/0015399 A1 | 1/2004 | Maggio |
| 2004/0054589 A1 | 3/2004 | Nicholas et al. |
| 2004/0174597 A1 | 9/2004 | Craig et al. |
| 2007/0136133 A1* | 6/2007 | Li ................................ 705/14 |
| 2007/0288350 A1 | 12/2007 | Bykowsky |
| 2008/0060003 A1* | 3/2008 | Nocifera .............. G06Q 30/02 725/35 |
| 2008/0140493 A1 | 6/2008 | DeAngelis |
| 2008/0301794 A1 | 12/2008 | Lee |
| 2009/0012868 A1 | 1/2009 | DeAngelis et al. |
| 2009/0012880 A1 | 1/2009 | Tortola |
| 2009/0030788 A1* | 1/2009 | Boudah et al. ................ 705/14 |
| 2009/0144157 A1 | 6/2009 | Saracino et al. |
| 2010/0191600 A1* | 7/2010 | Sideman .................... 705/14.53 |
| 2010/0295839 A1 | 11/2010 | Nagaya |
| 2010/0332331 A1 | 12/2010 | Etchegoyen |
| 2011/0035287 A1* | 2/2011 | Fox .......................... 705/14.69 |
| 2011/0055915 A1 | 3/2011 | Hall |
| 2011/0106618 A1 | 5/2011 | Ben-Moshe |
| 2011/0125588 A1* | 5/2011 | Turner et al. ............. 705/14.69 |
| 2011/0178878 A1 | 7/2011 | Ballout |
| 2011/0193842 A1 | 8/2011 | Biernath |
| 2011/0208580 A1* | 8/2011 | Wolinsky .............. G06Q 30/02 705/14.48 |
| 2011/0214044 A1 | 9/2011 | Davis |
| 2011/0282727 A1 | 11/2011 | Phan et al. |
| 2011/0288915 A1 | 11/2011 | Mochizuki |
| 2012/0047024 A1* | 2/2012 | Urban et al. .............. 705/14.69 |
| 2012/0130635 A1 | 5/2012 | Nakamura |
| 2012/0130855 A1* | 5/2012 | Nielsen et al. ............. 705/26.43 |
| 2012/0150586 A1 | 6/2012 | Harper et al. |
| 2013/0024757 A1 | 1/2013 | Doll |
| 2013/0313976 A1 | 5/2013 | Lin |
| 2013/0185162 A1* | 7/2013 | Mo ............................ 705/14.69 |
| 2013/0212619 A1 | 8/2013 | Yerli |
| 2013/0339156 A1 | 12/2013 | Sanjay |
| 2014/0025499 A1 | 1/2014 | O'Donnell |
| 2014/0028879 A1 | 1/2014 | Morino |
| 2014/0035814 A1 | 2/2014 | de Lima |
| 2014/0067549 A1* | 3/2014 | Park et al. ................ 705/14.68 |
| 2014/0122248 A1 | 5/2014 | Kuzama et al. |
| 2014/0136935 A1 | 5/2014 | Santillie |
| 2014/0164131 A1 | 6/2014 | Kim |
| 2014/0222578 A1* | 8/2014 | Poornachandran et al. ................. 705/14.61 |
| 2014/0324944 A1 | 10/2014 | Christopher |
| 2015/0134460 A1 | 5/2015 | Tian |

OTHER PUBLICATIONS

"An emerging marketplace for digital advertising based on amalgamated digital signage networks". J.V. Harrison: A. Andrusiewicz. Date of Conference: Jun. 24-27, 2003. Print ISBN: 0-7695-1969-5. Publisher: IEEE. Conference Location: Newport Beach, CA USA.

A Cloud-based Signage Network System. Yan Peng. School of Computer Engineering, Shenzhen Polytechnic, Shenzhen, Guang Dong, 518055, China. Date of Conference: Jun. 29-30, 2013. Date Added to IEEE Xplore: Sep. 16, 2013. ISBN: 978-0-7695-5016-9.

Liu et al., "Interactive Wireless Electronic Billboard", Proceedings of the 2004 IEEE Int'l Conf. on Networking, Sensing and Control, vol. 1, pp. 553-558, Mar. 2004.

Stackoverflow, "Why is it a bad practice to return generated HTML instead of JSON? Or is it?", Aug. 16, 2009 all pages.

Wikihow, internet publication "How to upload and animation signature" captures Jun. 25, 2012, https://archive.org/web/*/https://www.wikihow.com/Upload-an-Animation-in-a-signature.

Ju et al., "Cardboard People: A parameterized Model of Articulated Image Motion", Proceedings of the 2nd Int'l Conf. on Automatic Face and Gesture Recognition, IEEE, 1996.

* cited by examiner

SYSTEMS AND METHODS FOR PROCESSING PAYMENTS TO TRIGGER RELEASE OF DIGITAL ADVERTISING CAMPAIGNS FOR DISPLAY ON DIGITAL SIGNAGE DEVICES

FIELD

The present systems and methods relate generally to computer hardware and software systems for distributing media content to networks of digital signage devices upon receipt of payment, and more particularly to systems and methods for processing payments to trigger release of digital media content for display on digital signage devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Typically, if an advertiser wanted to display content on one or more signage devices, one option would be to contact the owner of each device, negotiate a price for displaying the content on the signage device, and coordinate remittance of payment to the owner of the device. This could involve setting up an escrow account with the owner of the signage device, collecting bank information from the owner of the signage device and coordinating a wire transfer or credit card payment with the owner's bank, paying through a third-party service such as PAYPAL, or other such payment options. Further, the cost associated with displaying certain advertising campaigns may exceed the credit limits on typical credit cards, thus necessitating the need to deal directly with banks or other financial institutions to confirm the availability of funds and other related information.

Additionally, the advertiser had to coordinate delivery or the advertisement to the signage device or signage devices, which could entail physically delivering the content to a network administrator who would then upload the content to each of the signage devices individually. For example, an advertiser could mail a USB mass storage device (i.e., "thumb drive") to the network administer who would then upload the content at each signage device, where it could then be displayed. As will be understood and appreciated, such a process is both time consuming and difficult to manage as someone must walk from signage device to signage device while keeping track of each upload.

Therefore, there is a long-felt but unresolved need for a system that allows advertisers to upload media content and choose signage devices upon which to display the content and timeslots at which the content should be displayed. Further, there is a need for a centralized system that allows advertisers and their customers to remit payment for the display of the media content to the owners of the signage devices. Additionally, there is a need for a system in which confirmation of payment remittance triggers the release of the media content to the signage devices or triggers the display of the content on the signage devices.

SUMMARY OF THE DISCLOSURE

Certain aspects of the present disclosure direct to a system. In certain embodiments, the system includes a management server configured to receive payment remittance information from a user via a remote computing device, wherein the payment remittance information relates to an advertising campaign comprising media content stored at the management server designated to be displayed at one or more timeslots, transmit the payment remittance information to a financial institution associated with the management server for processing, receive confirmation from the financial institution that the payment remittance has been processed, update the advertising campaign to reflect the confirmation from the financial institution, and upon receipt of a request for advertising campaign information relating to the advertising campaign, transmit the advertising campaign information to a signage device. The signage device includes a processor, a media player, and a non-volatile memory storing a computer-executable program. The program, when executed by the processor, is configured to send the request for the advertising campaign information to the management server, receive the advertising campaign information from the management server, confirm the payment remittance related to the advertising campaign information, and transmit the media content to the media player for display on the signage device.

In certain embodiments, the payment remittance information comprises at least payment date; payment amount; advertising campaign identifier; signage device identifier; credit card information; wire transfer information; and currency type.

In certain embodiments, the financial institution associated with the management server is operatively connected to one or more financial institutions.

In certain embodiments, the advertising campaign information includes a program list. In certain embodiments, the program list includes advertising campaign information associated with a particular signage device. In certain embodiments, the program list includes at least payment status; links to the media content; and timeslot information.

In certain embodiments, the confirmation from the financial institution specifies one or more timeslots for which payment has been remitted. In certain embodiments, each of the timeslots identifies a particular time and date at which the media content is to be displayed on the signage device. In certain embodiments, the timeslots are specified for a particular duration. In certain embodiments, the media content is specified for a plurality of timeslots.

Certain aspects of the present disclosure direct to a method of processing digital media content payments, including: receiving, at a management server, payment remittance information from a user via a remote computing device, wherein the payment remittance information relates to an advertising campaign comprising media content stored at the management server designated to be displayed at one or more timeslots; transmitting, from the management server, the payment remittance information to a financial institution associated with the management server for processing; receiving, at the management server, confirmation from the financial institution that the payment remittance has been processed; updating, at the management server, the advertising campaign to reflect the confirmation from the financial institution; receiving, at the management server, a request for advertising campaign information relating to the advertising campaign from a signage device; and in response to the request, transmitting, from the management server, the advertising campaign information to the signage device, wherein the signage device is configured to send the request for the advertising campaign information to the management server, receive the advertising campaign information from the management server, confirm the payment remittance related to the advertising campaign information, and transmit the media content to a media player of the signage device for display on the signage device.

In certain embodiments, the payment remittance information comprises at least payment date; payment amount; advertising campaign identifier; signage device identifier; credit card information; wire transfer information; and currency type.

In certain embodiments, the financial institution associated with the management server is operatively connected to one or more financial institutions.

In certain embodiments, the advertising campaign information includes a program list. In certain embodiments, the program list includes advertising campaign information associated with a particular signage device. In certain embodiments, the program list includes at least payment status; links to the media content; and timeslot information.

In certain embodiments, the confirmation from the financial institution specifies one or more timeslots for which payment has been remitted. In certain embodiments, each of the timeslots identifies a particular time and date at which the media content is to be displayed on the signage device. In certain embodiments, the timeslots are specified for a particular duration. In certain embodiments, the media content is specified for a plurality of timeslots.

Certain aspects of the present disclosure direct to a non-transitory computer readable medium storing computer executable codes. The codes, when executed at a processor of a management server, are configured to receive payment remittance information from a user via a remote computing device, wherein the payment remittance information relates to an advertising campaign comprising media content stored at the management server designated to be displayed at one or more timeslots, transmit the payment remittance information to a financial institution associated with the management server for processing, receive confirmation from the financial institution that the payment remittance has been processed, update the advertising campaign to reflect the confirmation from the financial institution, receive a request for advertising campaign information relating to the advertising campaign from a signage device, and in response to the request, transmit the advertising campaign information to the signage device, wherein the signage device is configured to send the request for the advertising campaign information to the management server, receive the advertising campaign information from the management server, confirm the payment remittance related to the advertising campaign information, and transmit the media content to a media player of the signage device for display on the signage device.

In certain embodiments, the payment remittance information comprises at least payment date; payment amount; advertising campaign identifier; signage device identifier; credit card information; wire transfer information; and currency type.

In certain embodiments, the financial institution associated with the management server is operatively connected to one or more financial institutions.

In certain embodiments, the advertising campaign information includes a program list. In certain embodiments, the program list includes advertising campaign information associated with a particular signage device. In certain embodiments, the program list includes at least payment status; links to the media content; and timeslot information.

In certain embodiments, the confirmation from the financial institution specifies one or more timeslots for which payment has been remitted. In certain embodiments, each of the timeslots identifies a particular time and date at which the media content is to be displayed on the signage device. In certain embodiments, the timeslots are specified for a particular duration. In certain embodiments, the media content is specified for a plurality of timeslots.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
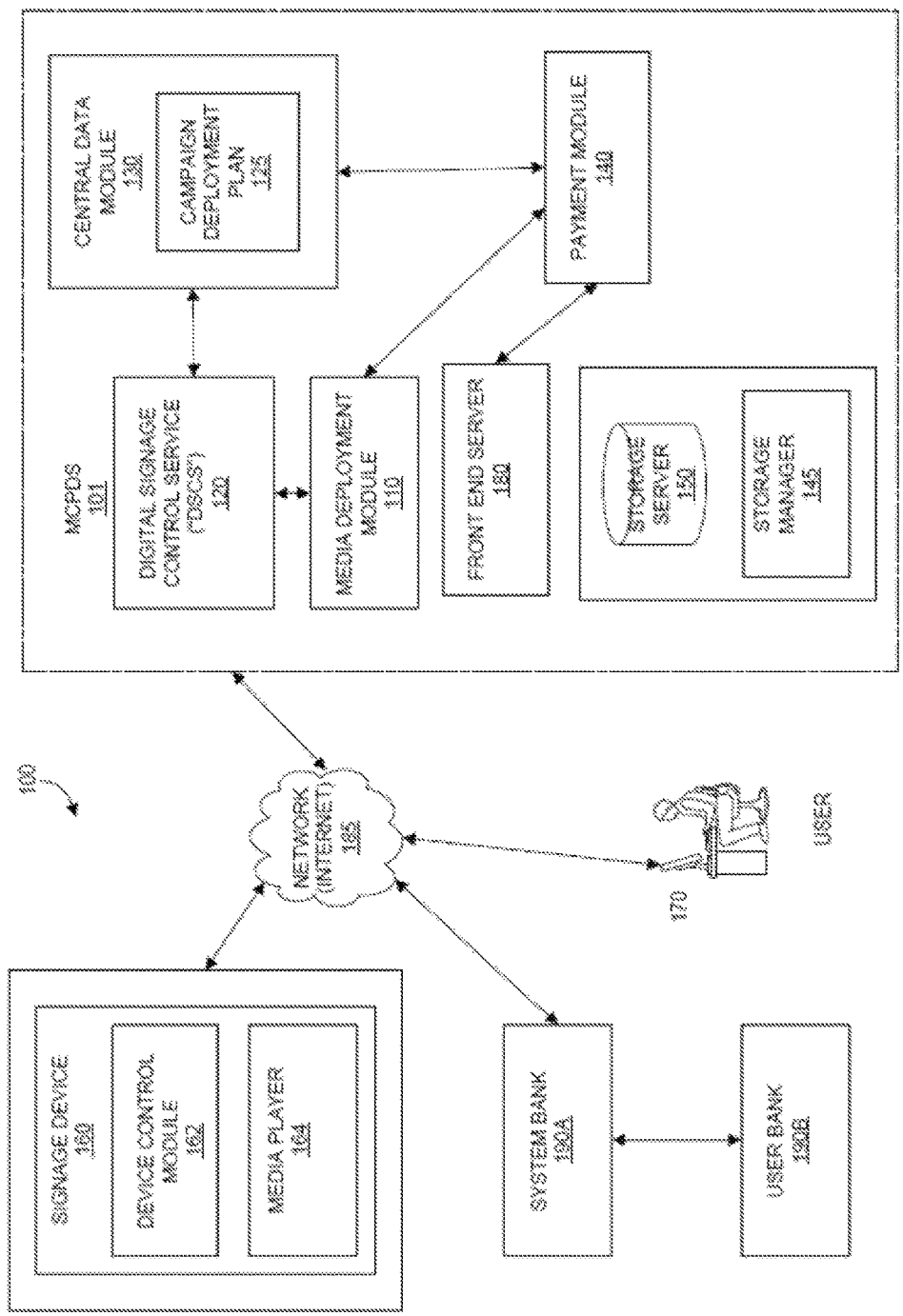
FIG. 1 illustrates an exemplary system environment in which an embodiment of the disclosed media content payment and delivery system ("MCPDS") is utilized.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Aspects of the present disclosure relate generally to computer hardware and software systems for triggering the display of media content on digital signage devices upon receipt of payment. In certain embodiments, after creating an advertising campaign that specifies certain media content to be displayed on certain digital signage devices, a user then inputs payment information to compensate the owner of the signage device for allowing the media content to be displayed on the signage device. According to one aspect, a media content payment and delivery system ("MCPDS") is capable of accepting and processing payments via credit card or via wire transfer. facilitates delivery of media content to a particular digital signage device or group of digital signage devices.

According to one aspect, after generating a campaign deployment plan, which typically specifies which media content to display, when and where the content should be displayed, and for how long the content should be displayed, the MCPDS waits for a user to initiate a payment remittance relating to the campaign deployment plan. Subsequent to processing the user's payment, the MCPDS updates the associated deployment plan to indicate the payment has been received and content is approved for display on the specified signage devices. According to a further aspect, subsequent to generating a campaign deployment plan, the MCPDS distributes content and information relating to the plan to the specified digital signage devices. According to this aspect, however, information relating to the plan indicates payment has not yet been received and the media content should not be displayed on the signage device. Once payment has been remitted, according to the aspect, the plan and information relating thereto is updated, and upon receipt of the updated information, the signage device allows display of the media content.

Referring now to the figures, FIG. 1 illustrates an overview 100 of a media content payment and delivery system ("MCPDS") 101 in an exemplary environment, constructed and operated in accordance with various aspects of the present disclosure. As shown in FIG. 1, the MCPDS 101 comprises a digital signage control service ("DSCS") 120 and payment module 140 for carrying out and coordinating various computer-implemented processes of the MCPDS 101. The exemplary MCPDS 101 also comprises a central data module 130 and media deployment module 110 for carrying out various other computer-implemented processes of the MCPDS 101. Embodiments of the MCPDS 101 further comprise various storage servers for storing system data and media content, such as storage server 150. Further embodiments of the MCPDS 101 comprise a front end server 180 for delivering various content to web applications associated with the MCPDS. Architectural details relating to various software modules, engines, and databases comprising an embodiment of the MCPDS 101 are described in greater detail below in relation to FIGS. 1 and 2.

As discussed and according to the embodiment shown in FIG. 1, an MCPDS 101 comprises a DSCS 120, a payment module 140, and various other software engines, modules, and databases, which are operatively connected through a computer network 185. Typically, such operative connections involve a secure connection or communications protocol, and communications over a network typically involve the use of one or more services such as a Web-deployed service with client/server architecture, a corporate Local Area Network ("LAN") or Wide Area Network ("WAN"), or through a cloud-based system. According to a further embodiment not shown in FIG. 1 and as will be understood by one of ordinary skill in the art, an MCPDS 101 may comprise a unitary system, or the functionalities can be carried out by a consolidated system, and it is unnecessary for these systems to be separate and discrete.

The MCPDS 101 is in communication with a communication network 185 (such as Internet). A digital signage device 160 is in communication with the communication network 185. Though not shown, in one embodiment, a signage device or private network of signage devices may communicate with the network 185 through an entry point such as a router. Although FIG. 1 only shows a single signage device 160, it will be understood and appreciated by one of ordinary skill in the art that one or more signage devices can be deployed in a private digital network, which is connected to the MCPDS 101. Further, multiple digital signage devices and multiple private networks may be connected to an MCPDS 101 directly through the network 185. Operative connections between an MCPDS 101 and a signage device 160 or a private network of signage devices can involve a secure connection or communications protocol. Moreover, in addition to routers, various networking components such as switches, hubs, etc., are typically involved in such communications, and although not shown in FIG. 1, certain embodiments of the present disclosure may include one or more secure networks, gateways, or firewalls that provide information security from unwanted intrusions and cyber-attacks.

In one embodiment, users interact with the MCPDS 101 via a user interface 170 that is part of a web application presented by a web browser that is in operative connection with the front end server 180 of the MCPDS 101. According to one embodiment, the user interface 170 allows a user to manage payment remittance for an advertising campaign or for a portion of an advertising campaign. As will be understood, embodiments of the MCPDS 101 allow a user (or representative of the user) to develop advertising campaigns, which specify media content to be displayed, signage devices or groups of signage devices upon which the content is to be displayed, times and dates when the media should be displayed (i.e., claimed timeslots), and other information relevant to the campaign. Further, advertising campaigns include information about the cost associated with displaying the content on the various signage devices. In one embodiment, users at a user interface 170 can input credit card information, wire transfer information, or other payment information, to remit payment for a particular ad campaign. According to one aspect, a user's representative (e.g., an advertising agency) can utilize the MCPDS 101 to create an advertising campaign and then remit payment on behalf of the user. Alternatively, subsequent to the creation of the campaign, the user could engage the MCPDS 101 via the user interface 170 to remit payment for the campaign.

As will be discussed, in relation to payment remittance, the user interface 170 will provide the user with options for providing certain payment information. In one embodiment, such information may include: an identifier associated with the user; an identifier associated with the user's bank; a payment date; a payment amount; currency type; credit card information (e.g., number, expiration date, security code, etc.); an identifier associated with the particular campaign for which payment is being remitted; an identifier associated with the particular signage device upon which the media content is to be displayed; an identifier associated with a group of signage devices. The user interface may prompt the user to provide additional payment information as will be understood by one of ordinary skill in the art.

As will be understood by one of ordinary skill in the art, the user interface 170 can be implemented in various forms. For example, the user interface 170 can be implemented by a web browser such as INTERNET EXPLORER, FIREFOX, GOOGLE CHROME, SAFARI, etc. The management webpages displayed at the user interface 170 can utilize JavaScript. Further, the user interface 170 can utilize ADOBE FLASH. The user interface 170 can be implemented in any suitable computing devices such as desktop computers, laptop computers, tablet computers, mobile phones, etc. Such flexibility gives users the freedom to remit payments associated with advertising campaigns from virtually anywhere.

As shown in the FIG. 1 embodiment, the MCPDS 101 is in operative communication with a financial services provider or financial institution such as system bank 190A (i.e., the bank employed by the MCPDS 101), which is likewise in communication with various other financial services providers or financial institutions such as user bank 190B (i.e., the bank employed by the user shown in conjunction with user interface 170). According to one embodiment, and as will be described, via a user interface 170, users are able to remit payment associated with an advertising campaign. As discussed, the user interface 170 allows the user to input payment remittance information, which is transmitted to the MCPDS 101 for processing. According to the preferred embodiment, the MCPDS 101 then transmits the payment remittance information to the system bank 190A, which then communicates with the user's bank (i.e., 190B) to confirm payment. Once payment is approved, payment approval information is transmitted from the user's bank 190B to the system bank 190A and then to the MCPDS 101, where the payment approval information can be associated with the particular advertising campaign.

Typically, digital signage devices (e.g., 160) as shown in FIG. 1 are configured to display digital media content. For example, digital signage devices can display facility-related announcements, weather updates, or multimedia content such as videos or movie clips. In certain aspects, such multimedia content may comprise an advertising campaign such as a commercial. For example, in a shopping mall, a network of digital signage devices could be configured to simultaneously display information relating to a promotion at a store in the shopping mall, followed by a weather report, then an announcement informing patrons that an escalator was out of service, and then a commercial for a new soft drink. In one embodiment, each digital signage device is equipped with a device control module ("DCM") (e.g., 162) for carrying out and coordinating various computer-implemented processes of the digital signage device (e.g., 160). In one embodiment, such processes include coordinating acquisition of information relating to various media campaigns from the MCPDS 101. Further, in one embodiment, a digital signage device is equipped with a media player (e.g., 164) for displaying various media content on the signage device 160.

As indicated, according to the embodiment shown in FIG. 1, the MCPDS 101 is in operative connection with signage device 160 via a network 185. According to one aspect, to prevent unwanted access to the signage device 160 by hackers or others with malicious intent, and to prevent unwanted content from being delivered to the signage device 160 via the network 185, the MCPDS 101 only responds to requests from the signage device 160, and sends no unsolicited content.

As previously discussed, according to the present embodiment, signage devices are equipped with a device control module ("DCM") (e.g., 162) for carrying out and coordinating various computer-implemented processes of the digital signage device (e.g., 160). Further as noted, according to the embodiment, the signage device 160 comprises a media player (e.g., 164) for displaying various announcements or playing back certain media content received from an MCPDS 101 by the DCM 162.

In one embodiment, the DCM 162 is configured to process a program list (as will be further described below) received from an MCPDS 101 to determine whether payment has been remitted for the media content specified by the program list for display on the particular signage device 160. According to one aspect, if the program list indicates that payment has not been remitted for a specific item of media content specified in the program list, the DCM 162 will not display the content on the signage device 160 during the time slots as specified by the program list. According to the further aspect, upon determination that payment has not been remitted for a particular item of media content in the program list, the DCM 162 is configured to periodically query the DSCS 120 for updated program lists until the list specifies payment remittance for the item of content. According to one aspect, the DCM 162 is configured to disregard an acquired item of media content specified in the program list after a predetermined period of time if no updated program list is received indicating payment associated with the content has been remitted. In a further embodiment, if payment has not been confirmed for a particular item of media content, instead of displaying the particular item of media content in the timeslot specified by the program list, the DCM 162 may be configured to display alternate content during the timeslot. According to one aspect, this alternate content may be a blank screen, an alternate announcement, alternate media content, etc.

Figure 2:
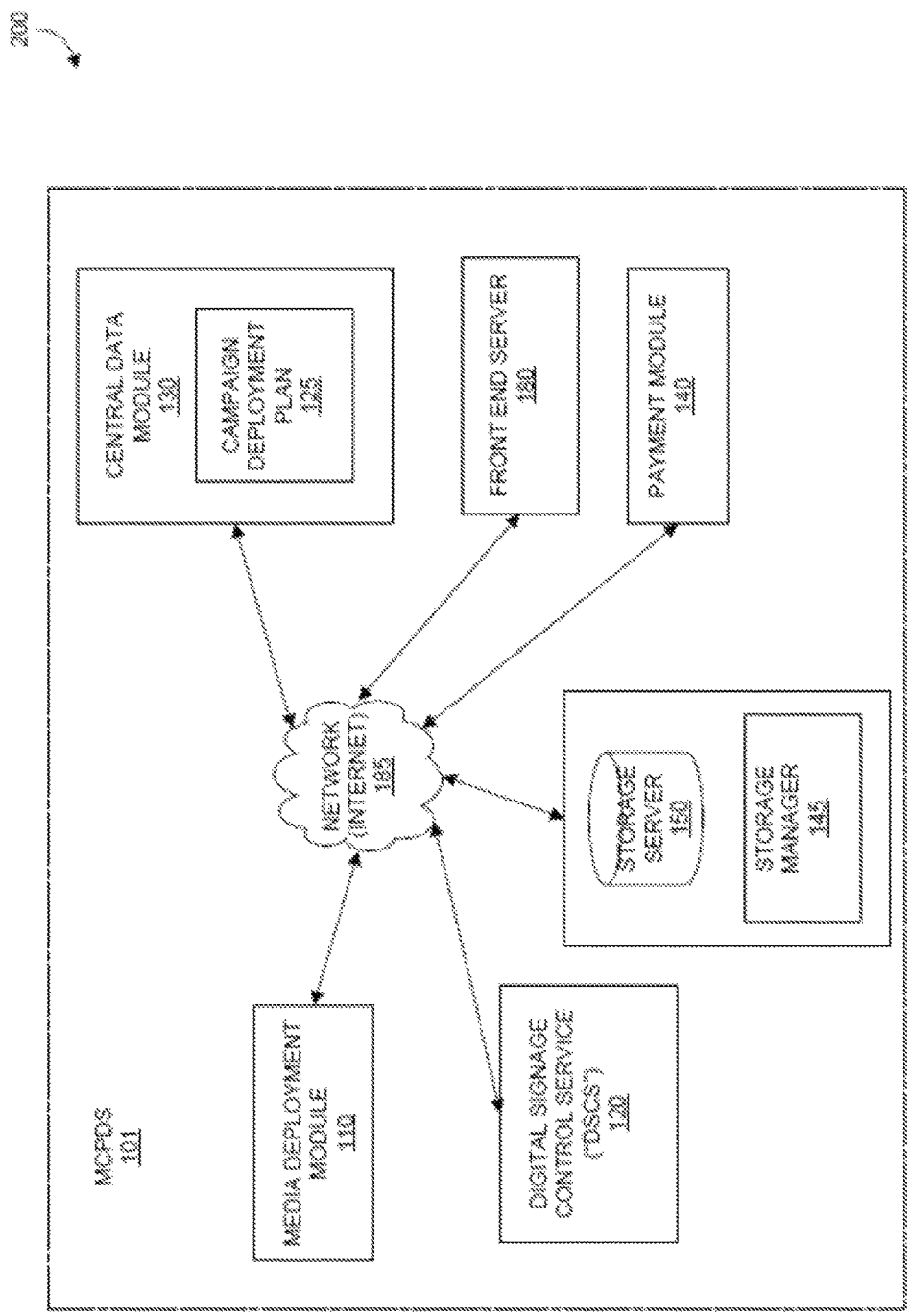
FIG. 2 illustrates an exemplary system architecture of an MCPDS, according to one embodiment of the present disclosure.

The discussions above in association with FIG. 1 are merely intended to provide an overview of an embodiment of the present system. Accordingly, it will be understood that the descriptions in this disclosure are not intended to limit in any way the scope of the present disclosure. Various architectural details of an embodiment of the disclosed MCPDS 101 will be described next in greater detail FIG. 2 illustrates an exemplary system architecture 200 of an MCPDS 101 according to one embodiment of the present disclosure. According to one aspect, an MCPDS 101 can be a scalable cloud system. As shown and discussed previously, an MCPDS 101 comprises at least a media deployment module 110, a digital signage control service ("DSCS") 120, a central data module 130, and a payment module 140, and a storage service 150. According to one embodiment, the various components are servers or collections of modules comprising databases and various software as well as hardware. Further, according to one embodiment, components of an MCPDS 101 hosted in a cloud system can be operatively connected and communicate via a network 185 (i.e., via the Internet), as shown in FIG. 2.

In general, the media deployment module 110 in accordance with a user's instructions facilitates the deployment of one or more media files from one or more storage servers to one or more signage devices. The user can directly specify the selected timeslots and signage devices for displaying a media file. Alternatively, the user can specify certain criteria for selecting timeslots and signage devices for a specific campaign. The media deployment module 110 then utilizes certain determination logic to determine the specific timeslots and signage devices for displaying the media file in accordance with the user's criteria. Subsequently, according to one embodiment, the media deployment module 110 then generates a campaign deployment plan 125, which specifies which content is to be presenting on which signage devices at which timeslots.

For example, for a specific advertising campaign, a user may instruct the media deployment module 110 to deploy the various media files to various timeslots at various signage devices. Based on the user's instruction, the media deployment module 110 can construct a campaign deployment plan 125 (i.e., an instruction for deploying media content), which, according to one embodiment, can include information relating to that particular advertising campaign. Specifically, a campaign deployment plan 125 identifies particular deployment information. This deployment information can include a signage device ID, which identifies a specific signage device selected to display the campaign, and/or a group ID, which identifies which group of digital signage devices have been selected to display the campaign. For example, the group of signage devices can all belong to a private network. The deployment information can also include one or more content IDs identifying the one or more media files to be displayed at the selected timeslots of the selected signage devices. A user can create a campaign that displays the same one or more media files in one or more groups of signage devices. Alternatively, a user can create a campaign having a single media file to be displayed a single time on a single signage device.

Additionally, according to one embodiment, the deployment information can include time slot information, which indicates the date(s) and time(s) when the campaign is to be displayed. Again, a user could create a long-running campaign in which content is to be displayed multiple times each day for an entire month. Alternatively, a user could create a campaign to appear on a single signage device at a specific time. For example, and individual could create a campaign consisting of a "FURNITURE ON SALE" message that is to run on a particular signage device, on a particular date, at a particular time. Finally, in one embodiment, the deployment information may include a content ID that identifies the particular media content (e.g., a single "FURNITURE ON SALE" message, a 60-second soft drink commercial, etc.).

Further, according to one embodiment, the deployment information can include information relating to the campaign's payment status. For example, the payment status could indicate that full payment has been remitted for the entire campaign. Alternatively, the payment status could indicate that the status of the campaign was "unpaid." According to one aspect, if the payment status indicated no payment had been remitted, the media deployment module 110 may wait to deploy the campaign until the payment status was updated to indicate payment had been remitted. Further, according to one aspect, the payment status could indicate that a payment had been remitted for a portion of the campaign. For example, a user may create a campaign wherein content is to be displayed on the signage devices within a private network (i.e., to an entire group of signage devices identified by a particular group ID) as well as to various individual signage devices, each identified by their own unique ID. In such a case, it is possible that the user would remit payment only for the individual signage devices and wait to remit payment for the signage devices in the private network. In such a case, the payment status may be updated to indicate that payment had been remitted for the individual signage devices (identified by their digital signage IDs), while no payment had been remitted for the signage devices associated with the group ID. According to one aspect, the media deployment module 110 could initiate the deployment of the media content associated with the individual signage devices and wait to initiate deployment of the content for the signage devices in the private network.

In certain embodiments, after the media deployment module 110 determines a campaign deployment plan 125 for a specific campaign, the user can review the deployment plan via the user interface 170 and then instruct the media deployment module 110 to execute the campaign deployment plan 125. The media deployment module 110 informs the DSCS 120 that the specific campaign is ready to be deployed. For example, the media deployment module 110 can store a campaign deployment plan 125 to the central data module 130 and identify that campaign deployment plan 125 with a campaign ID. Subsequently, the media deployment module 110 can send the campaign ID to the DSCS 120 and then request that the DSCS 120 deploy the campaign.

The front end server 180 provides various user interfaces to the various users. The users can use those user interfaces (e.g., 170) to interact and communicate with the MCPDS 101. For example, the front end server 180 can provide different user interfaces to advertisers, signage device owners, and company users. As used herein, "user" refers to the advertisers, the signage device owners, and the company users, unless otherwise noted.

In general, company users or advertisers representing a company can use the user webpage (i.e., user interface 170) to create one or more advertisement campaigns. In general, an advertisement campaigns refers to displaying various media content items at various locations (e.g., signage device 160) at various times for promoting or marketing a product or service. For example, a user can create a campaign to promote a new beverage. This campaign can involve displaying a video commercial on all signage devices in a shopping mall in New York City every Saturday from 2 PM to 4 PM in December this year as well as displaying a poster image on signage devices at five major intersections of New York City every day in December this year.

In certain embodiments, initially the user interface 170 of the user webpage allows a user to browse all the signage devices managed by the MCPDS 101 and further browse all the available timeslots of each managed signage device. For example, the user webpage can allow a user to browse signage devices at different geographic location levels such as country, state/province, city, street/intersection, etc. When the user selects a city name (e.g. New York City), the user webpage sends a request to the front end server 180 for identifiers of all the streets that have managed signage devices in that city. The front end server 180, upon receipt of a geographic location identifier (e.g. New York City), can query the media deployment module 110 to retrieve the geographic location identifiers at the next level (e.g., street names). In one embodiment, the media deployment module 110 can then return a data object including the geographic location identifiers at the next level back to the front end server 180.

In certain embodiments, based on a particular signage device ID, the front end server 180 can request from the media deployment module 110 the available time slot and the price information from the central data module 130. For example, the front end server 180 can request the information for each signage device at the particular location. As noted, in one embodiment, the media deployment module 110 can return one or more data objects including information regarding available time slots and the price for a particular signage device.

In certain embodiments, after receiving the signage device information and the available time slot and the price information, the front end server 180 can send one or more data objects including that information to the web browser, which can display information of all the signage devices at the particular location and the available time slot and price information for each signage device to the user via the user interface 170.

Subsequently, the user can decide to claim one or more particular timeslots of one or more particular signage devices for the campaign that the user is building. For example, after the user chooses the timeslot at the browser, the browser sends the timeslot and signage device information to the front end server 180. The front end server 180, in turn, instructs the media deployment module 110 to claim the specified time slot of the particular signage device (e.g., 160) for the specific user, who can be identified by a user ID. Then, according to one embodiment, the media deployment module 110 communicates with the other components of the MCPDS 101 to claim the specified timeslot. After the media deployment module 110 has successfully claimed the timeslot, it can send a confirmation to the front end server 180. The front end server 180, in turn, can send that confirmation to the web browser.

In certain embodiments, the central data module 130 provides a centralized data store for storing all or most information other than media files used by the MCPDS 101. As will be discussed in detail, the media files uploaded by the end users into the MCPDS 101 typically are stored in the storage server 150. The central data module 130, however, can store a collection of data specifying all the media files. Data relating to a particular media file can be organized in a particular media-file data structure. For example, data relating to a particular media file can include one or more of: the title of the file, the length of the file, the size of the file, the format of the file, a description of the contents of the file, a product category of the product being presented in an advertisement file, the target audience (e.g., demographic information) of the file, the target venues at which the file should be played. Further, the data also includes a storage link which can be used to retrieve the media file from the storage server 150.

Additionally, the central data module 130 can store a collection of data specifying each signage device (e.g., 160) managed by the MCPDS 101. Further, data relating to a particular signage device (e.g., 160) can be organized in a particular signage device data structure. For example, data relating to the particular signage device 160 can include one or more of: a signage device ID identifying this particular signage device 160, one or more group IDs identifying one or more groups to which this particular signage device 160 belongs, one or more network IDs identifying the one or more networks to which this particular signage device 160 belongs, the popularity of the particular signage device 160, and the technical specification (e.g. resolution, size, 3-D features, etc.) of the particular signage device 160.

Further, the central data module 130 can store a collection of data specifying campaign deployment plans (e.g., 125) for each individual campaign, as discussed above. Further, data relating to a particular campaign deployment plan 125 can be organized in a particular campaign-deployment-plan data structure. For example, data relating to a particular campaign deployment plan 125 can include one or more of: a campaign ID identifying the campaign to which the particular deployment plan is directed, and one or more deployment entries. Each deployment entry can specify a content ID identifying a media file that is to be deployed, a group ID identifying the group of signage devices to which a media file should be deployed or a signage device ID identifying a particular signage device to which a media file should be deployed, a timeslot in which the deployed media file should be displayed, and a payment status indicating whether full, partial, or no payment has been remitted in relation to the campaign.

Further, the central data module 130 can store a collection of data specifying timeslots of each signage device 160 that have been allocated to a campaign. Further, data relating to allocated timeslots of a particular signage device 160 can be organized in a particular allocated-timeslot data structure. Data relating to allocated timeslots of a particular signage device 160 can include one or more of: a signage device ID identifying the particular signage device 160 and a program entry for each of the allocated timeslots. The program entry can specify the specific time period of the associated timeslot, the price paid for that timeslot, a campaign ID identifying the campaign to which the timeslot is allocated, and a content ID identifying a media file that is to be displayed at this particular time slot.

In one embodiment, the central data module 130 receives a write instruction from the media deployment module 110 specifying content and other information to be stored in the storage service in association with a particular campaign deployment plan 125.

In certain embodiments, the central data module 130 can include a claimed timeslot data collection containing detailed data specifying the timeslots claimed by each campaign or user. For each claimed timeslot, the data generally includes the signage device ID, the timeslot information, the sale price, the campaign ID, the content ID, the file ID, the storage link. The information in the claimed timeslot data collection indicates that a particular timeslot of a particular signage device (e.g., 160) is claimed by a campaign at a particular price.

As discussed above in connection with FIG. 1, the MCPDS 101 is in operative communication with a financial services provider such as system bank 190A (i.e., the bank employed by the MCPDS 101), which is likewise in communication with various other financial services providers such as user bank 190B (i.e., the bank employed by the user). In general, the payment module 140 facilitates the payment remittance process associated with various advertising campaigns embodied by campaign deployment plans (e.g., 125).

As noted previously, according to one embodiment, via a user interface 170, users are able to remit payment associated with an advertising campaign. As discussed, via a user interface 170, a user can review a campaign deployment plan 125 for a specific campaign. Additionally, the user can inquire as to the payment status of the campaign. Upon receiving the user's inquiry, the payment module 140 queries the central data module 130 for the payment status. According to one aspect, the payment module 140 requests the payment status in relation to a digital signage ID, a group ID, or a campaign ID. Further, according to one aspect, the user ID could be associated with the particular user, and the payment module 140 could query the payment status of all campaigns associated with the user ID.

After receiving the payment status of, for example, the particular campaign deployment plan 125, the payment module 140 returns the payment status to the user such that the user can input payment remittance information. In one embodiment, the payment status could be acquired from the claimed timeslot data collection. As discussed, such payment remittance information can include: an identifier associated with the user; an identifier associated with the user's bank; a payment date; a payment amount; currency type; credit card information (e.g., number, expiration date, security code, etc.); an identifier associated with the particular campaign for which payment is being remitted; an identifier associated with the particular signage device upon which the media content is to be displayed; an identifier associated with a group of signage devices.

Upon receipt of the payment remittance information, according to one embodiment, the payment module 140 then transmits the payment remittance information to the system bank 190A. As noted, the system bank 190A is generally a bank associated with the MCPDS 101 who assists in processing payments on behalf of the MCPDS 101 and communicates with other customer banks on behalf of the MCPDS 101. Generally, once the system bank 190A receives the payment remittance information, the system bank can coordinate the payment with the respective customer bank (e.g., 190B), as will be understood by one of ordinary skill in the art.

After coordinating the payment with the user bank, the system bank 190A generally receives a payment confirmation, which it then transmits to the payment module 140, according to one embodiment. The payment module 140 then communicates the payment confirmation to the central data module 130 such that it can update the payment status associated with the particular specified campaign deployment plan 125. Additionally, according to one embodiment, the payment module 140 communicates the payment confirmation to the central data module such that the payment status of the claimed time slots list can also be updated.

Further, according to one embodiment, the payment module 140 communicates the payment confirmation information to the media deployment module 110 to indicate that the deployment module 110 has permission to notify the DSCS 120 that the particular campaign is ready to be deployed. As discussed, to notify the DSCS 120 that a specific campaign is ready to be deployed, the media deployment module 110 sends a campaign ID to the DSCS 120 and requests that the DSCS 120 deploy the campaign. As noted previously, in one embodiment, the media deployment module is configured to wait until confirmation is received from the payment module 140 that full payment has been remitted for a particular campaign before sending the campaign ID to the DSCS 120 and requesting that the DSCS 120 deploy the campaign. In an alternate embodiment, the deployment module is configured to request deployment of the campaign irrespective of payment remittance information. As will be understood and appreciated, a particular advertising campaign may involve the transmission of large media files to various signage devices, which can be a time-consuming process. Instead of waiting for payment remittance confirmation, the system can begin deploying the campaign and associated media content to the respective signage devices. As previously discussed, the DCM 162 of the signage device 160 can be configured to hold the content until confirmation of payment remittance has been received via an updated program list.

In the FIG. 2 embodiment, the digital signage control service ("DSCS") 120 is in communication with the signage devices (e.g., 160). As described above, the DSCS 120 can receive a campaign deployment instruction from the media deployment module 110. The campaign deployment instruction informs the DSCS 120 that a specific campaign is ready to be deployed to the intended signage devices. According to one embodiment, the campaign deployment instruction comprises the campaign ID. The DSCS 120 then can obtain a campaign deployment plan 125 for that specific campaign. Based on the campaign deployment plan 125, the DSCS 120 can determine what media files should be distributed to which signage devices. Using the content IDs specified in the campaign deployment plan 125, the DSCS 120 can query the central data module 130 to obtain a storage link that can be used to retrieve the corresponding media file from the storage server 150. Further, the DSCS 120 can query the central data module 130 for the payment status associated with the timeslots specified in the campaign deployment plan.

According to one embodiment, the DSCS 120 can generate a program list for each signage device specified in the campaign deployment plan. Typically, the program list will be specific to a particular signage device (identified by its signage device ID), and will include links to the media content that should be displayed on the signage device at a particular timeslot. Further, the program list may include the payment status for the particular timeslots. As will be understood and appreciated, generating a signage-device-specific program list makes it unnecessary to send the entire campaign deployment plan to each signage device specified in the plan. Then, the next time a signage device makes an inquiry to the DSCS 120 for available content to be delivered to that signage device, the DSCS 120 can transmit the program list to the signage device to inform the signage device of the media files and the associated storage links of the media files.

In certain embodiments, after generating and deploying a program list associated with a particular media deployment campaign, information associated with a particular deployment plan may be updated. For example, a user could decide to change the timeslots during which the media content is to be displayed on a signage device. Further, the payment status associated with a particular timeslot could change. For instance, the timeslots associated with a media deployment plan may have been unpaid when the media deployment plan was originated and retrieved by the DSCS 120. At some later time, however, the user may have remitted payment associated with the plan, at which time the payment status of the timeslots would be updated. In such a case, according to one embodiment, the media deployment module 110 may resend a particular campaign ID to the DSCS 120, at which point the DSCS 120 retrieves the updated media deployment plan and generates updated program lists.

As noted, in certain embodiments, the media deployment module 110 instructs the DSCS 120 that a particular campaign is ready to be deployed by sending a campaign ID to the DSCS 120 in a message. Using the campaign ID, the DSCS 120 can retrieve a campaign deployment plan 125 from the central data module 130. As described above, the campaign deployment plan 125 specifies detail information regarding a particular campaign such as what media files should be played at which signage device at which timeslots. In certain embodiments, a signage device can periodically send requests to the DSCS 120 to check if there are media files or program lists available to that signage device. The DSCS 120, in turn, can examine the campaign deployment plan 125 to determine whether a program list or updated program list is to be deployed to that signage device and then informs the results to the signage device.

In certain embodiments, the storage server 150 provides a mechanism to allow other components of the MCPDS 101 to store data objects in the storage server 150. For example, the storage server 150 can provide a write function that another component can call to pass on a data object. After receiving the data object, the storage server 150 stores the data object and generates a data-object identifier identifying the stored data object. The storage server 150 can return the data-object identifier back to the component requesting to store the data object. The storage server 150 can further provide a read function that another component can call to retrieve a data objects stored in the storage server 150 using a data-object identifier. As stated, the storage server 150 can retrieve the data object identified by the data-object identifier and return the retrieved data object back to the component requesting to retrieve the data object.

In certain embodiments, the storage server 150 operates in conjunction with a storage manager 145 to provide a distributed mechanism to deliver media files stored in the storage server 150 to signage devices. As has been discussed, each signage device (e.g., 160) periodically queries the DSCS 120 to check if any media file is ready to be deployed to that signage device 160. As discussed above, the DSCS 120 checks the current campaign deployment plan 125 to determine whether there is any media file to be deployed to the inquiring signage device 160. As discussed, the DSCS 125 may also check the current campaign deployment play 125 to determine whether payment has been remitted in relation to the plan. When there is a media file to be deployed, the DSCS 120 returns, among other things, the storage link of the media file. The storage link indicates the location of the storage manager and the data object identifier identifying the media file stored in the storage server 150. Subsequently, the storage manager 145 can then receive from a signage device 160 a request for a particular media file using a storage link. Based on the request, the storage manager 145 can then assist in the process of delivering the content to the signage device 160.

As indicated, according to the embodiment shown in FIG. 1, the MCPDS 101 is in operative connection with a signage device 160 via a network, which may be connected to a router or similar device, which manages communications between the various components of the MCPDS 101 and the signage device 160.

Figure 3A:
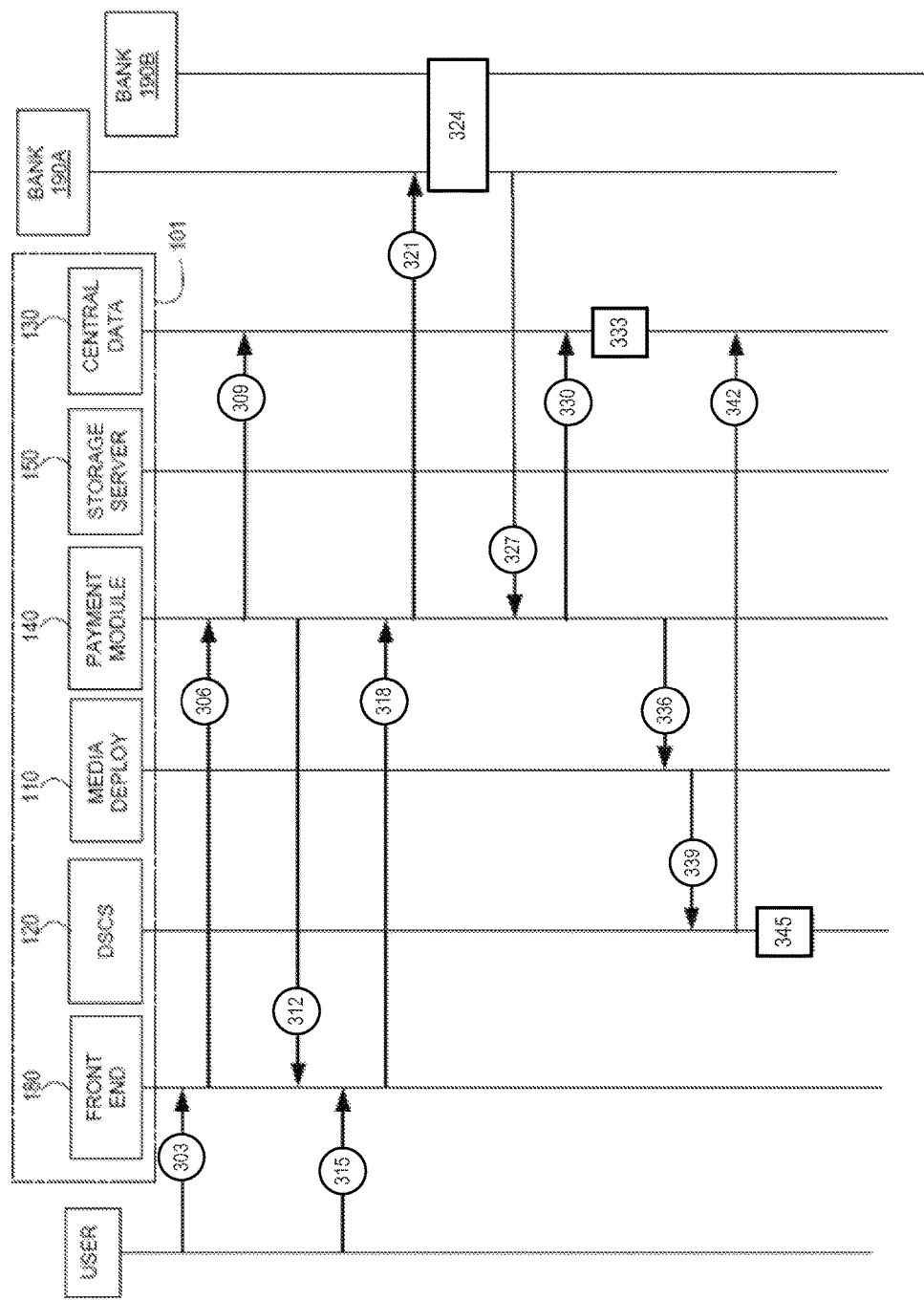
FIGS. 3A and 3B are a sequence diagram showing an exemplary computer-implemented process wherein an MCPDS receives payment information associated with a media campaign, which in turn triggers release of the media campaign such that it can be displayed on specified digital signage devices.
Figure 3B:
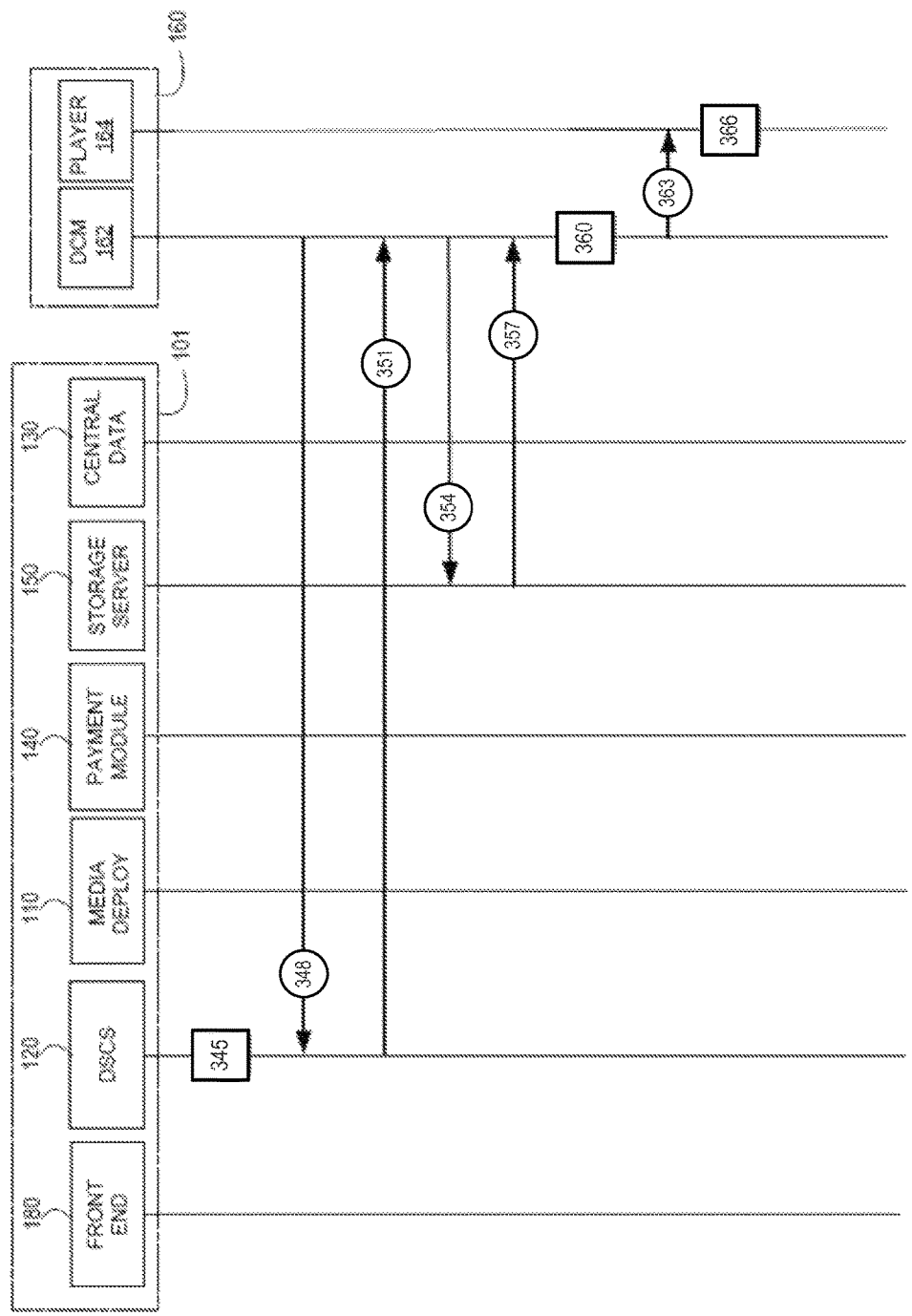

FIGS. 3A and 3B represent a sequence diagram illustrating an exemplary process whereby a user engages the MCPDS 101 to determine whether payment is due for advertising campaigns and subsequently remits payment at which time the MCPDS 101 updates the associated deployment plan and subsequently delivers the associated media content to the appropriate signage device, where it can then be displayed. In the particular example, an MCPDS 101 is in operative connection with a user via a user interface 170 as well as a system bank 190A. Further, the MCPDS 101 is in operative connection with the signage device 160 (as shown in FIG. 3B).

As shown in FIG. 3A, according to one embodiment, at 303, a front end server 180 receives an inquiry from a user to determine if payments are due in association with the user's advertising campaigns. At 306, the front end server 180 transmits the user's inquiry to the payment module 140, which then queries central data module 130 to determine whether payments are due, at 309. As noted, a determination as to whether payments are due can be made based on an identifier associated with the user or the user's account, an identifier associated with a particular campaign (i.e., campaign ID), an identifier associated with a group of signage devices (i.e., group ID), an individual signage device (digital signage ID), or other such identifiers.

Upon receipt of information relating to payments due, at 312, the payment module 140 returns the information to the front end server 180, which then transmits the information to be displayed to the user via the user interface 170. Once the user receives information regarding payments due, according to the FIG. 3 embodiment, at 315, the user inputs payment remittance information. As previously discussed, such information may include credit card information, bank information (for wire transfers), payment amount, payment date, and to which campaign or which portion of a campaign the payment is to be attributed. The front end server 180 then transmits the payment remittance information to the payment module 140 at 318, wherein the payment module 140 communicates the information to the system bank 190A, at 321.

As shown in the FIG. 3 embodiment, at 324, the system bank communicates with the user bank 190B (as specified in the payment remittance information received at 315) to verify payment, as will be understood by one of ordinary skill in the art. Upon processing the payment, at 327, the payment module 140 receives payment remittance confirmation from the system bank 190A. At 330, according to the FIG. 3 embodiment, the payment module confirms the payment remittance to the central data module 130, which updates the appropriate campaign deployment plan and claimed timeslot information, at 333. At 336, the payment module 140 notifies the media deployment module 110 that payment has been remitted for a particular media deployment plan, which at 339 releases the deployment plan ID to the DSCS 120. At 342, the DSCS 120 retrieves the plan from central data module 130 based on the deployment plan ID, and then generates the appropriate program lists based on the information in the deployment plan, at 345. As noted, according to the disclosed embodiment, the DSCS 120 then holds the various program lists generated based on the deployment plan until the DSCS 120 receives inquiry from a signage device specified in the plan.

Moving to FIG. 3B, the sequence continues at 348 where the DSCS 120 receives an inquiry for media content from the DCM 162 of a signage device 160. At 351, the DSCS 120 deploys the appropriate program list to the signage device 160 as specified in the media deployment plan. Upon receipt of the program list, at 354, the DCM 162 begins acquiring the content specified in the program list from the storage server 150. When the DCM 162 receives the specified content at 357, according to the FIG. 3 embodiment, the DCM confirms the payment status of the received content from the associated program list, at 360. Upon determination that payment has been remitted for the particular media content, at 363, the DCM 162 provides the content to the media player 164 such that it can be displayed on the signage device at 366.

Figure 4A:
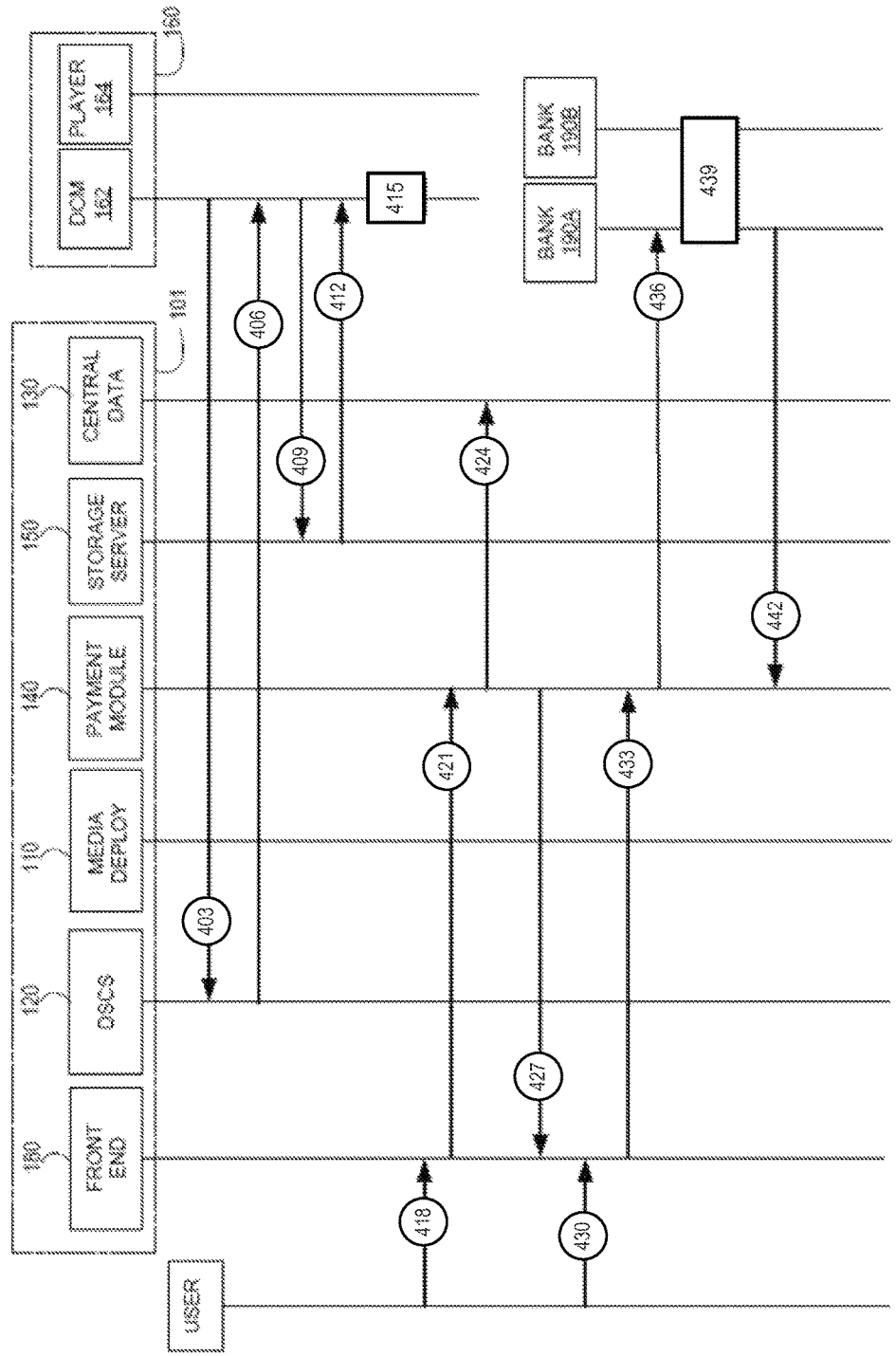
FIGS. 4A and 4B are a sequence diagram showing an exemplary computer-implemented process wherein an MCPDS releases a media campaign to a specified digital signage device and then receives payment information associated with a media campaign, which in turn provides payment confirmation to the signage device such that the media campaign can be displayed on the signage device.
Figure 4B:
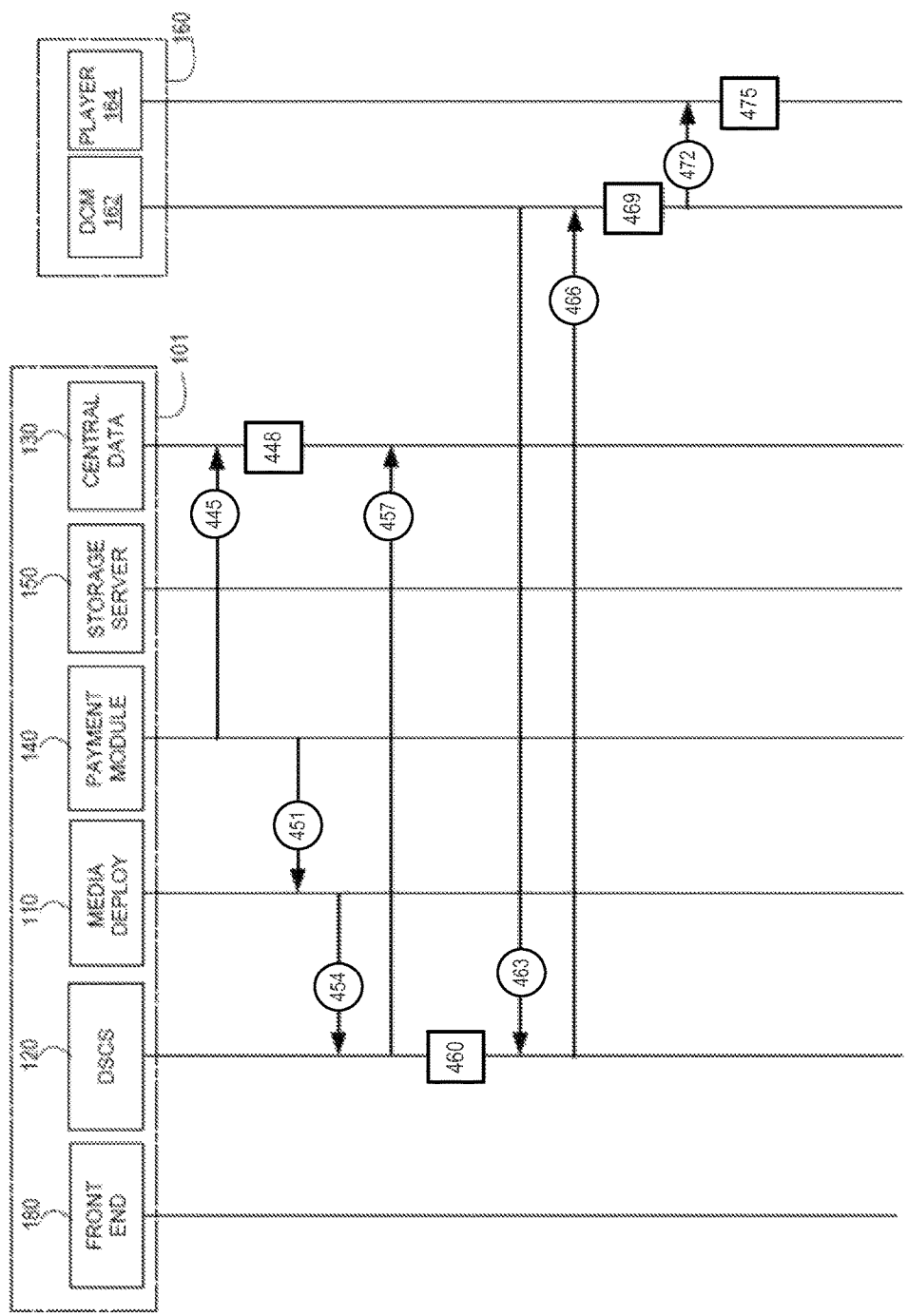

FIGS. 4A and 4B represent a sequence diagram illustrating an alternative exemplary process whereby content is distributed to a signage device as specified in a program list prior to confirmation of payment remittance. At 403, the DSCS 120 receives an inquiry for media content from the DCM 162 of a signage device 160. Subsequently, at 406, the DSCS 120 deploys the appropriate program list, as specified in the appropriate media deployment plan, to the signage device 160. At 409, upon receipt of the program list, the DCM 162 requests content specified in the program list from the storage server 150. Upon receipt of the media content at 412, the DCM 162 checks the program list for the payment status of the acquired content, at 415.

In the FIG. 4 example, as payment remittance has yet to be confirmed, the DCM 162 does not provide the media content to the media player 164 for display on the signage device during the specified timeslot. According to one aspect, the media player 164 simply displays a blank screen during the timeslot. According to a further aspect, the media player 164 may display a default advertisement or announcement. For example, the default announcement could notify those interested in purchasing timeslots on the signage device of who to contact for further information. According to the FIG. 4 embodiment, upon determination that payment remittance has not been confirmed, the DCM 162 is configured to hold the media content and periodically request updated program lists until payment remittance has been confirmed.

Continuing, at 418, as described in relation to FIG. 3A, a front end server 180 receives an inquiry from a user to determine if payments are due in association with the user's advertising campaigns. At 421, the front end server 180 transmits the request to the payment module 140. The payment module 140 then queries the central data module 130, at 424, to determine whether payments are due and transmits the information back to the front end server 180 so that the information can be provided to the user, at 427.

As discussed in relation to 315-321 in FIG. 3A, once the user receives information regarding payments due, the user inputs payment remittance information, at 430. The front end server 180 then transmits the payment remittance information to the payment module at 433, which in turn communicates the information to the system bank 190A, at 436. As further discussed in relation to FIG. 3A, the system bank communicates with the user bank 190B verify payment, at 439. After the payment is processed, 442, the payment module 140 receives payment remittance confirmation from the system bank 190A.

Continuing to FIG. 4B, the payment module confirms the remittance to the central data module 130, at 445, which updates the appropriate campaign deployment plan and claimed timeslot information, at 448. At 451, the payment module 140 notifies the media deployment module 110 that payment has been remitted for a particular media deployment plan, which at 454 re-releases the deployment plan ID to the DSCS 120. At 457, the DSCS 120 retrieves the updated plan from central data module 130, and then generates the appropriate updated program lists based on the updated payment remittance information in the deployment plan, at 460.

At 463, the sequence continues when the DSCS 120 receives an inquiry from the DCM 162 for an updated program list to confirm payment remittance for the previously-acquired media content. The DSCS 120 deploys the updated program list to the signage device 160 at 466, and upon receipt of the updated program list, at 469, the DCM 162 confirms the payment status of the previously-acquired content. Upon determination that payment has been remitted for the particular media content, at 472, the DCM 162 provides the content to the media player 164 such that it can be displayed on the signage device at 475.

Also, though not shown in FIG. 3A, 3B, 4A, or 4B, it will be understood by one of ordinary skill in the art that as discussed previously, a router or similar device may manage communications between the various components of the MCPDS 101 and the system bank 190A and signage device 160.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the inventions to the precise forms disclosed. Many modifications and variations are possible in light of the above teaching. The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system comprising:
a private network;
a plurality of signage devices within the private network, the plurality of signage being assigned to a group identified by a particular group ID;
at least one individual signage device outside the private network;
a media content payment and delivery server connected to the private network and comprising a deployment module, configured to
receive payment remittance information from a user via a remote computing device, wherein the payment remittance information relates to an advertising campaign comprising media content stored at the media content payment and delivery server designated to be displayed at one or more timeslots, wherein the advertising campaign specifies that the media content is to be displayed at the plurality of signage devices and at the at least one signage device, wherein the payment remittance information specifies a payment for the at least one individual signage device and not for the plurality of signage devices;
transmit the payment remittance information to a financial institution associated with the media content payment and delivery server for processing,
receive confirmation from the financial institution that the payment remittance has been processed,
update the advertising campaign to reflect the confirmation from the financial institution, and
upon receipt of a request for advertising campaign information relating to the advertising campaign, transmit the advertising campaign information to one or more signage devices,
wherein each of the plurality of signage devices comprises a processor, a media player, and a non-volatile memory storing a computer-executable program, wherein the program of each of the plurality of signage devices, when executed by the processor, is configured to
send the request for the advertising campaign information to the media content payment and delivery server;
receive the advertising campaign information from the media content payment and delivery server;
when a confirmation of the payment remittance related to the advertising campaign has not been received at the each signage device, obtain a first video file of the media content from the media content payment and delivery server over the private network, store the first video file locally at the each signage device, and refrain from displaying the first video file of the media content at the media player;
after receiving the media content, hold the locally stored first video file of the media content without displaying until confirmation of the payment remittance has been received,
when a confirmation of the payment remittance related to the advertising campaign has been received at the each signage device, transmit the first video file of the media content to the media player and display, at the media player without obtaining the first video file over the private network again, the locally stored first video file of the media content disregard the locally stored first video and display a blank screen in response to not receiving, within a predetermined time, the confirmation of the payment remittance related to the advertising campaign information,
wherein the at least one individual signage device comprises a processor, a media player, and a non-volatile memory storing a computer-executable program, wherein the at least one individual signage device, when executed by the processor, is configured to,
when a confirmation of the payment remittance related to the advertising campaign has been received at the at least one individual signage device and has not been received at the plurality of signage devices within the private network, display the media content while the plurality of signage devices refrain from displaying the first video file of the media content at the media player;
wherein the display of the first video file at each of the plurality of the signage devices is simultaneous;
wherein the deployment module identifies deployment information comprising (1) a signage device identification (ID) to identify a specific signage device selected to display the advertising campaign and/or a group ID to identify which group of digital signage devices have been selected to display the advertising campaign; (2) one or more content IDs identifying the one or more media files to be displayed at selected timeslots of selected signage devices; (3) time slot information which indicates a date and time when the advertising campaign is to be displayed; and (4) information relating to payment status of the advertising campaign; and wherein the deployment module deploys various media files to various timeslots at various signage devices in accordance with the deployment information upon receipt of payment.

2. The system of claim 1, wherein the payment remittance information comprises at least payment date; payment amount; advertising campaign identifier; signage device identifier; credit card information; wire transfer information; and currency type.

3. The system of claim 1, wherein the financial institution associated with the media content payment and delivery server is operatively connected to one or more financial institutions.

4. The system of claim 1, wherein the advertising campaign information comprises a program list.

5. The system of claim 4, wherein the program list comprises advertising campaign information associated with a particular signage device.

6. The system of claim 5, wherein the program list comprises at least payment status; links to the media content; and timeslot information.

7. The system of claim 1, wherein the confirmation from the financial institution specifies one or more timeslots for which payment has been remitted.

8. The system of claim 7, wherein each of the timeslots identifies a particular time and date at which the media content is to be displayed.

9. The system of claim 8, wherein the timeslots are specified for a particular duration.

10. A method of processing digital media content payments, comprising:

receiving, at a media content payment and delivery server comprising a deployment module, payment remittance information from a user via a remote computing device, wherein the payment remittance information relates to an advertising campaign comprising media content stored at the media content payment and delivery server designated to be displayed at one or more timeslots, wherein the advertising campaign specifies that the media content is to be displayed at a plurality of signage devices within a private network and at at least one signage device outside the private network, the plurality of signage being assigned to a group identified by a particular group ID, wherein the payment remittance information specifies a payment for the at least one individual signage device and not for the plurality of signage devices;

transmitting, from the media content payment and delivery server, the payment remittance information to a financial institution associated with the media content payment and delivery server for processing;

receiving, at the media content payment and delivery server, confirmation from the financial institution that the payment remittance has been processed;

updating, at the media content payment and delivery server, the advertising campaign to reflect the confirmation from the financial institution;

receiving, at the media content payment and delivery server, a request for advertising campaign information relating to the advertising campaign from the plurality of signage devices and the at least one signage device; and in response to the request, transmitting, from the media content payment and delivery-server, the advertising campaign information to the plurality of signage devices and the at least one signage device, wherein each of the plurality of signage devices is configured to send the request for the advertising campaign information to the media content payment and delivery server, receive the advertising campaign information from the media content payment and delivery server, when a confirmation of the payment remittance related to the advertising campaign has not been received at the each signage device, obtain a first video file of the media content from the media content payment and delivery server over the network, store the first video file locally at the each signage device, and refrain from displaying the first video file of the media content at the media player, after receiving the media content, hold the locally stored first video file of the media content without displaying until confirmation of the payment remittance has been received, when a confirmation of the payment remittance related to the advertising campaign has been received at the each signage device, transmit the first video file of the media content to the media player and display, at the media player without obtaining the first video file over the private network again, the locally stored first video file of the media content disregard the locally stored first video and display a blank screen in response to not receiving, within a predetermined time, the confirmation of the payment remittance related to the advertising campaign information, wherein the at least one individual signage device is configured to:

when a confirmation of the payment remittance related to the advertising campaign has been received at the at least one individual signage device and has not been received at the plurality of signage devices within the private network, display the media content while the plurality of signage devices refrain from displaying the first video file of the media content at the media player;

wherein the display of the first video file at each of the plurality of the signage devices is simultaneous;

wherein the deployment module identifies deployment information comprising (1) a signage device ID to identify a specific signage device selected to display the advertising campaign and/or a group ID to identify which group of digital signage devices have been selected to display the advertising campaign; (2) one or more content IDs identifying the one or more media files to be displayed at selected timeslots of selected signage devices; (3) time slot information which indicates a date and time when the advertising campaign is to be displayed; and (4) information relating to payment status of the advertising campaign; and wherein the deployment module deploys various media files to various timeslots at various signage devices in accordance with the deployment information upon receipt of payment.

11. The method of claim 10, wherein the payment remittance information comprises at least payment date; payment amount; advertising campaign identifier; signage device identifier; credit card information; wire transfer information; and currency type.

12. The method of claim 10, wherein the financial institution associated with the media content payment and delivery server is operatively connected to one or more financial institutions.

13. The method of claim 10, wherein the advertising campaign information comprises a program list, wherein the program list comprises advertising campaign information associated with a particular signage device.

14. The method of claim 13, wherein the program list comprises at least payment status; links to the media content; and timeslot information.

15. The method of claim 10, wherein the confirmation from the financial institution specifies one or more timeslots for which payment has been remitted, wherein each of the timeslots identifies a particular time and date at which the media content is to be displayed.

16. The method of claim 15, wherein the timeslots are specified for a particular duration.

17. A non-transitory computer readable medium storing computer executable codes, wherein the codes, when executed at a processor of a media content payment and delivery server comprising a deployment module, are configured to receive payment remittance information from a user via a remote computing device, wherein the payment remittance information relates to an advertising campaign comprising media content stored at the media content payment and delivery server designated to be displayed at one or more timeslots, wherein the advertising campaign specifies that the media content is to be displayed at a plurality of signage devices within a private network and at at least one signage device outside the private network, the plurality of signage being assigned to a group identified by a particular group ID, wherein the payment remittance information specifies a payment for the at least one individual signage device and not for the plurality of signage devices, transmit the payment remittance information to a financial institution associated with the media content payment and delivery server for processing, receive confirmation from the financial institution that the payment remittance has been processed, update the advertising campaign to reflect the confirmation from the financial institution, receive a request for advertising campaign information relating to the advertising campaign from the plurality of signage devices and the at least one signage device, and in response to the request, transmit the advertising campaign information to the plurality of signage devices and the at least one signage device, wherein each of the plurality of signage devices is configured to send the request for the advertising campaign information to the media content payment and delivery server, receive the advertising campaign information from the media content payment and delivery server, when a confirmation of the payment remittance related to the advertising campaign has not been received at the each signage device, obtain a first video file of the media content from the media content payment and delivery server over a private network, store the first video file locally at the each signage device, and refrain from displaying the first video file of the media content at the media player, after receiving the media content, hold the locally stored first video file of the media content without displaying until confirmation of the payment remittance has been received, when a confirmation of the payment remittance related to the advertising campaign has been received at the each signage device, transmit the first video file of the media content to the media player and display, at the media player without obtaining the first video file over the private network again, the locally stored first video file of the media content disregard the locally stored first video and display a blank screen in response to not receiving, within a predetermined time, the confirmation of the payment remittance related to the advertising campaign information, wherein the at least one individual signage device is configured to:

when a confirmation of the payment remittance related to the advertising campaign has been received at the at least one individual signage device and has not been received at the plurality of signage devices within the private network, display the media content while the plurality of signage devices refrain from displaying the first video file of the media content at the media player;

wherein the display of the first video file at each of the plurality of the signage devices is simultaneous, wherein the deployment module identifies deployment information comprising (1) a signage device ID to identify a specific signage device selected to display the advertising campaign and/or a group ID to identify which group of digital signage devices have been selected to display the advertising campaign; (2) one or more content IDs identifying the one or more media files to be displayed at selected timeslots of selected signage devices; (3) time slot information which indicates a date and time when the advertising campaign is to be displayed; and (4) information relating to payment status of the advertising campaign; and wherein the deployment module deploys various media files to various timeslots at various signage devices in accordance with the deployment information upon receipt of payment.

18. The non-transitory computer readable medium of claim 17, wherein the payment remittance information comprises at least payment date; payment amount; advertising campaign identifier; signage device identifier; credit card information; wire transfer information; and currency type.

19. The non-transitory computer readable medium of claim 17, wherein the financial institution associated with the media content payment and delivery server is operatively connected to one or more financial institutions.

20. The non-transitory computer readable medium of claim 17, wherein the advertising campaign information comprises a program list, wherein the program list comprises advertising campaign information associated with a particular signage device, wherein the program list comprises at least payment status; links to the media content; and timeslot information.

21. The non-transitory computer readable medium of claim 17, wherein the confirmation from the financial institution specifies one or more timeslots for which payment has been remitted, wherein each of the timeslots identifies a particular time and date at which the media content is to be displayed.

22. The non-transitory computer readable medium of claim 21, wherein the timeslots are specified for a particular duration.

* * * * *